(12) United States Patent
He et al.

(10) Patent No.: US 12,456,523 B2
(45) Date of Patent: Oct. 28, 2025

(54) MEMORY DEVICES, MEMORY SYSTEMS, AND METHODS FOR OPERATING MEMORY DEVICES

(71) Applicant: YANGTZE MEMORY TECHNOLOGIES CO., LTD., Wuhan (CN)

(72) Inventors: Weiwei He, Wuhan (CN); Ke Liang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 143 days.

(21) Appl. No.: 18/542,206

(22) Filed: Dec. 15, 2023

(65) Prior Publication Data

US 2025/0104775 A1    Mar. 27, 2025

Related U.S. Application Data

(63) Continuation of application No. PCT/CN2023/121367, filed on Sep. 26, 2023.

(51) Int. Cl.
G11C 16/14 (2006.01)
G11C 16/04 (2006.01)
G11C 16/16 (2006.01)

(52) U.S. Cl.
CPC ......... *G11C 16/16* (2013.01); *G11C 16/0483* (2013.01)

(58) Field of Classification Search
CPC .................................................. G11C 16/14
See application file for complete search history.

(56) References Cited

U.S. PATENT DOCUMENTS

2023/0268008 A1    8/2023  He et al.
2025/0029660 A1*   1/2025  Jia ..................... G11C 16/3459

FOREIGN PATENT DOCUMENTS

| CN | 113129948 A | 7/2021 |
| CN | 114333935 A | 4/2022 |
| WO | 2022172318 A1 | 8/2022 |

\* cited by examiner

*Primary Examiner* — Jason Lappas
(74) *Attorney, Agent, or Firm* — BAYES PLLC

(57) ABSTRACT

The present disclosure discloses a memory device, a memory system, and a method for operating a memory device, belonging to the field of storage technology. In the present disclosure, by turning off the first switch circuit, turning on the second switch circuit and providing the first voltage to the first node, the first voltage is applied on the second terminal of the drive transistor through the second switch circuit and the source line, the second terminal of the drive transistor is coupled to a control terminal, such that the voltage of the control terminal changes as the voltage of the second terminal changes, since the first voltage is greater than the threshold voltage of the drive transistor, the drive transistor is turned on to trigger the drive transistor to assist the corresponding memory string in performing a gate-induced-drain-leakage (GIDL) erase.

20 Claims, 11 Drawing Sheets

MEMORY DEVICES, MEMORY SYSTEMS, AND METHODS FOR OPERATING MEMORY DEVICES

CROSS-REFERENCE TO RELATED APPLICATIONS

This application is a continuation of International Application No. PCT/CN2023/121367, filed on Sep. 26, 2023, which is incorporated herein by reference in its entirety.

FIELD OF TECHNOLOGY

The present disclosure relates to the technical field of storage, and in particular to a memory device (also referred as "a memory"), a memory system and a method for operating a memory.

BACKGROUND

A memory includes a peripheral circuit and a plurality of memory blocks coupled to the peripheral circuit, a drive transistor is disposed in the peripheral circuit of the memory, and during the erase operation of the memory block, erase voltages are provided to both ends of the memory string in the memory block through the drive transistor, such that the top select gate (TSG) and bottom select gate (BSG) of the memory string may generate gate-induced-drain-leakage (GIDL), so as to perform a GIDL erase on the memory string.

SUMMARY

Implementations of the present disclosure provide a memory, a memory system, and a method for operating a memory, which are capable of controlling a drive transistor to assist the corresponding memory string in performing a GIDL erase.

In a first aspect, the present disclosure provides a memory, the memory includes: a plurality of memory blocks, each of memory blocks including a plurality of memory strings, each of the memory strings being connected to a different bit line and a same source line respectively; and a peripheral circuit, the peripheral circuit including a plurality of drive transistors, a first switch circuit connected to control terminals of the plurality of drive transistors, and a second switch circuit connected to the source line, a first terminal of each of the drive transistors being connected to a different bit line, a second terminal is connected to the source line, and both of the first switch circuit and the second switch circuit being connected to a first node; wherein, the peripheral circuit is configured to perform an erase operation on the memory block, and for the erase operation to be performed, the peripheral circuit is configured to: turn off the first switch circuit to float the control terminals of the plurality of drive transistors; turn on the second switch circuit to provide a first voltage to the first node, wherein the first voltage is greater than a threshold voltage for the plurality of drive transistors.

In some implementations, the peripheral circuit is further configured to: before turning off the first switch circuit, turn on the first switch circuit, turn off the second switch circuit, and provide a second voltage to the first node, wherein the second voltage is less than the first voltage.

In some implementations, the peripheral circuit is further configured to: after providing the second voltage to the first node, turn off the first switch circuit and discharge the voltage provided to the first node from the second voltage to a third voltage.

In some implementations, the peripheral circuit is further configured to: before providing the second voltage to the first node, provide a fourth voltage to the first node, or firstly provide a fifth voltage to the first node, and then provide the fourth voltage to the first node, wherein the fifth voltage is less than the fourth voltage, and the fourth voltage is less than the second voltage.

In some implementations, the peripheral circuit is further configured to: before providing the first voltage to the first node, provide a sixth voltage to the bit line, or firstly provide a seventh voltage to the bit line, and then provide the sixth voltage to the bit line, wherein the seventh voltage is less than the sixth voltage, and the sixth voltage is less than the first voltage.

In some implementations, the peripheral circuit is further configured to: before providing the first voltage to the first node, provide an eighth voltage to the source line, or firstly provide a ninth voltage to the source line, and then provide the eighth voltage to the source line, wherein the ninth voltage is less than the eighth voltage, and the eighth voltage is less than the first voltage.

In some implementations, at least one of the first switch circuit and the second switch circuit includes a transistor.

In some implementations, at least one of the first switch circuit and the second switch circuit includes a transistor and a voltage converter, wherein the voltage converter is coupled to a control terminal of the transistor, the voltage converter is configured to: provide a voltage to the control terminal of the transistor to turn off or turn on the transistor.

In a second aspect, the present disclosure provides a memory system, the memory system includes a controller and a memory provided by the first aspect or any possible implementation of the first aspect described above, the controller is coupled to the memory and configured to control the memory.

In some implementations, the memory system further includes a host; the host is coupled to the controller, the host is configured to send data to the memory or receive data from the memory through the controller.

In a third aspect, the present disclosure provides a method for operating a memory, wherein the memory includes: a plurality of memory blocks, each of the memory blocks including a plurality of memory strings, each of the memory strings being connected to a different bit line and a same source line respectively; the different bit lines being connected to the first terminals of different drive transistors respectively, and both of the first switch circuit connected to the control terminals of the drive transistors and the second switch circuit connected to the source line being connected to the first node; the method includes performing an erase operation on the memory block, the erase operation including: turning off the first switch circuit to float the control terminals of the drive transistors; turning on the second switch circuit to provide a first voltage to the first node, wherein the first voltage is greater than a threshold voltage for the drive transistor.

In some implementations, the erase operation further includes before turning off the first switch circuit, turning on the first switch circuit, turning off the second switch circuit, and providing a second voltage to the first node, wherein the second voltage is less than the first voltage.

In some implementations, the erase operation further includes after providing the second voltage to the first node, turning off the first switch circuit and discharging the voltage provided to the first node from the second voltage to a third voltage.

In some implementations, the erase operation further includes before providing the second voltage to the first node, providing a fourth voltage to the first node, or firstly providing a fifth voltage to the first node, and then providing the fourth voltage to the first node, wherein the fifth voltage is less than the fourth voltage, and the fourth voltage is less than the second voltage.

In some implementations, the erase operation further includes before providing the first voltage to the first node, providing a sixth voltage to the bit line, or firstly providing a seventh voltage to the bit line, and then providing the sixth voltage to the bit line, wherein the seventh voltage is less than the sixth voltage, and the sixth voltage is less than the first voltage.

In some implementations, the erase operation further includes before providing the first voltage to the first node, providing an eighth voltage to the source line, or firstly providing a ninth voltage to the source line, and then providing the eighth voltage to the source line, wherein the ninth voltage is less than the eighth voltage, and the eighth voltage is less than the first voltage.

In some implementations, at least one of the first switch circuit and the second switch circuit includes a transistor.

In some implementations, at least one of the first switch circuit and the second switch circuit includes a transistor and a converter, the erase operation further includes: providing a voltage to the control terminal of the transistor to turn off or turn on the transistor.

The technical scheme provided by the present disclosure at least includes the following beneficial effects: the control terminal of the drive transistor is floated through turning off the first switch circuit, thereby the second terminal of the drive transistor is coupled with the control terminal, and the first voltage is provided to the first node through turning on the second switch circuit, so that the first voltage is applied on the second terminal of the drive transistor through the turned-on second switch circuit and the source line, such that the voltage at the control terminal of the drive transistor changes as the voltage at the second terminal changes. Since the first voltage is greater than the threshold voltage of the drive transistor, when the voltage at the control terminal reaches the threshold voltage, the drive transistor is turned on to trigger a GIDL erase on the memory string coupled to the bit line connected to the drive transistor.

DETAILED DESCRIPTION

In order to make the purpose, technical solution and advantages of the present disclosure clearer, implementations of the present disclosure may be further described in detail below in conjunction with the accompanying drawings.

Figure 1:
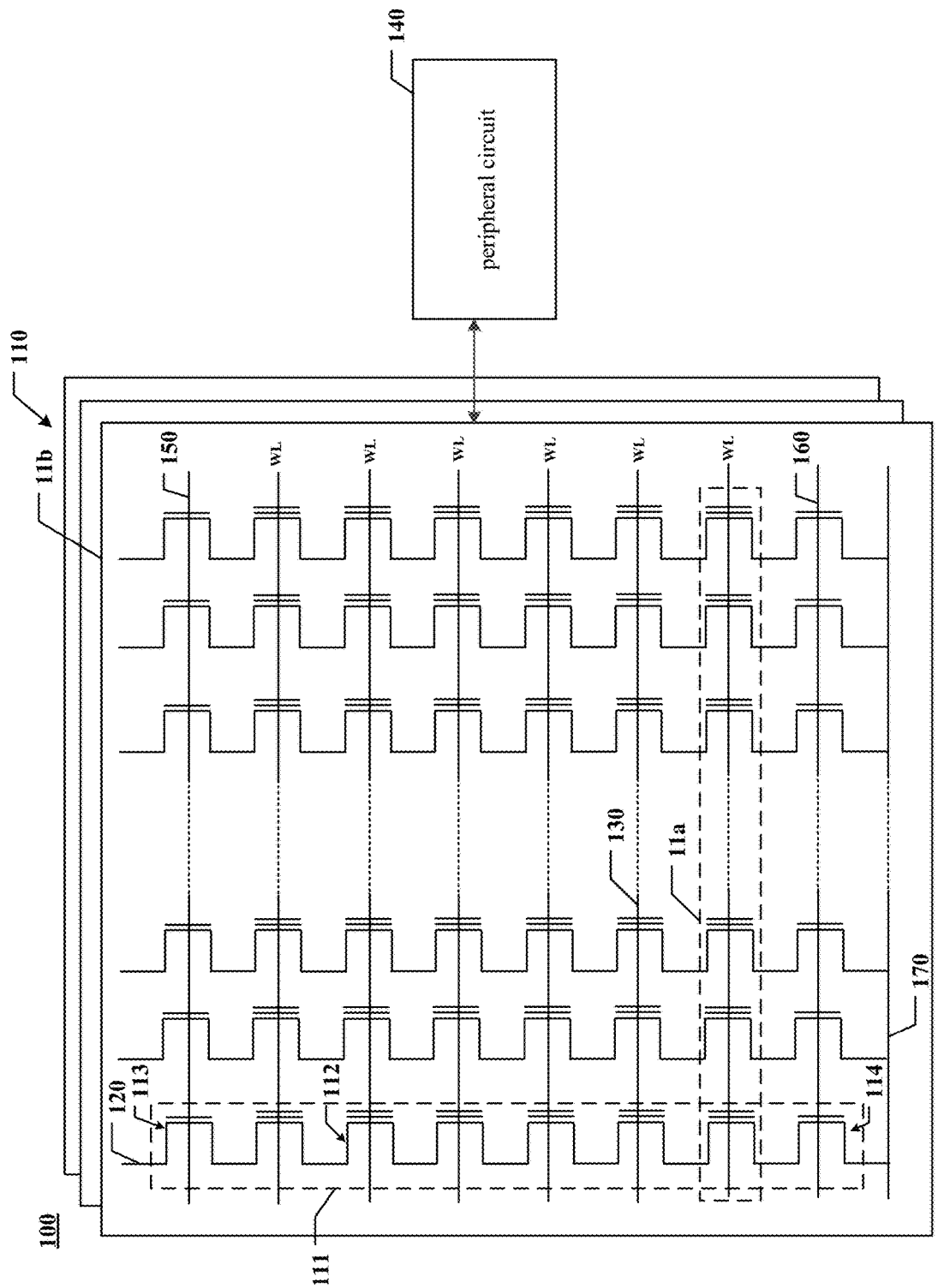
FIG. 1 is a schematic diagram of a memory shown according to some implementations of the present disclosure.

FIG. 1 is a schematic diagram of a memory shown according to some implementations of the present disclosure, As shown in FIG. 1, the memory 100 includes a memory array 110, a plurality of bit lines (BL) 120, a plurality of word lines (WL) 130 and a peripheral circuit 140.

The memory array 110 includes a plurality of memory strings 111 arranged in an array above a substrate (not shown), and each memory string 111 extends vertically above the substrate.

Each memory string 111 includes a plurality of memory cells 112, and the plurality of memory cells 112 in each memory string 111 are vertically stacked above the memory array 110 substrate. Each memory cell 112 has the function of storing data. the stored data is determined by the number of electrons stored in the memory cell 112, and the number of electrons stored in the memory cell 112 may determine the threshold voltage of the memory cell 112, therefore, the threshold voltage of the memory cell 112 may indicate the data stored therein. Wherein the memory cell 112 is a floating gate field effect transistor or a charge trap type field effect transistor. In some examples, the memory cell 112 may have two possible storage states, e.g., the memory cell 112 may be a single level cell (SLC) storing one bit of data. For example, the threshold voltage corresponding to the first storage state "0" of the SLC may be in a first voltage range, and the threshold voltage corresponding to the first storage state "1" of the SLC may be in a second voltage range. In other examples, the memory cell 112 may store at least two bits of data, e.g., the memory cell 112 is a multi-level cell (MLC), the MLC may store two bits per memory cell, or three bits per memory cell (also known as triple level cell (TLC)), or four bits per memory cell (also known as quad level cell (QLC)). Each MLC may be programmed to assume a range of possible nominal storage values.

Each memory string 111 also includes an upper selector transistor 113 and a lower selector transistor 114, the upper selector transistors 113 in different memory strings 111 with a same height or similar height from the substrate carrying surface are coupled to a same drain select line (DSL) 150. The lower select transistors 114 in different memory strings 111 with a same height or similar height from the substrate carrying surface are coupled to a same source select line (SSL) 160. Wherein the upper select transistor 113 and the lower select transistor 114 are used to activate the selected memory string when erasing, programming or erasing the memory cell. The upper select transistor 113 is also referred to as a top select gate (TSG), and the lower select transistor 114 is also referred to as a bottom select gate (BSG). One end of the memory string 111 is coupled to the bit line 120, and the other end of the memory string 311 is coupled to the source line (SL) 170.

As shown in FIG. 1, memory cells 112 in different memory strings 111 with a same height or similar height from the substrate carrying surface are in a same layer, a plurality of memory cells 112 in the same layer form a memory cell row 11a, i.e., the memory array 110 includes a plurality of memory cell rows, and a plurality of word lines 130 are respectively coupled to the plurality of memory cell rows. All memory strings 111 in the memory array 110 that share a same set of word lines form a memory block 11b, and each memory string 111 in a same memory block 11b is coupled to a same source line 170. That is, the memory 100 includes a plurality of memory blocks 11b, and each memory block 11b includes a plurality of memory strings 111, each memory string 111 in the same memory block 11b is connected to a different bit line 120 and a same source line 170 respectively.

Figure 2:
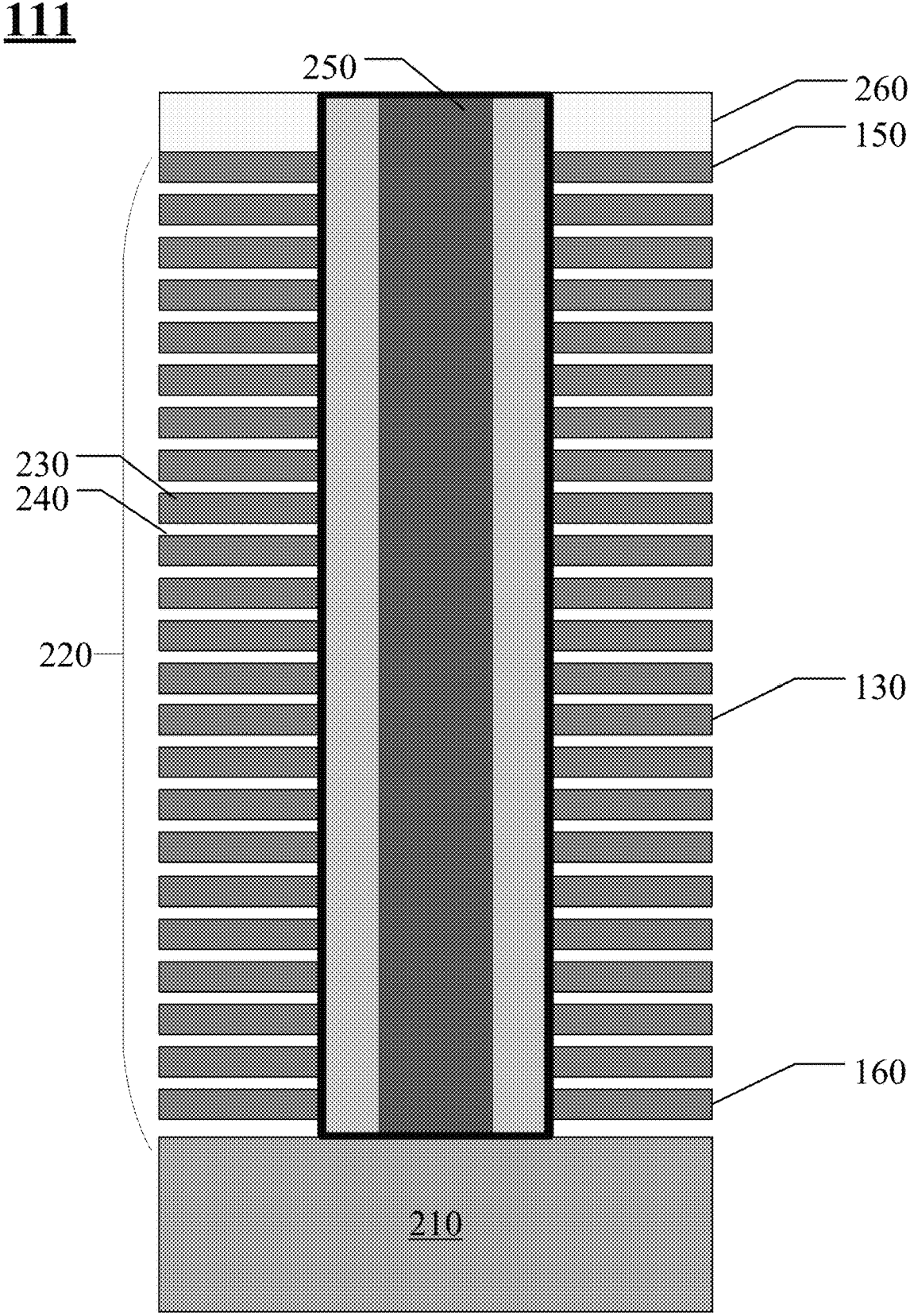
FIG. 2 is a cross-sectional side view of a substring shown according to some implementations of the present disclosure.

As the number of memory cell layers increases, it is required to form a plurality of stacks of memory strings 111 through a plurality of etchings. For example, FIG. 2 is a cross-sectional side view of a substring shown according to some implementations of the present disclosure. Referring to FIG. 2, the memory string 111 may extend vertically through the memory cell stack layer 220 over the doped semiconductor layer 210. The doped semiconductor layer 210 is coupled to the source line. In some examples, the doped semiconductor layer 210 is an N-type doped semiconductor layer, the doped semiconductor layer 210 in this case is an N well in the substrate, and the substrate in this case is an N-type substrate. In some other examples, the doped semiconductor layer 210 is a P-type doped semiconductor layer, the doped semiconductor layer 210 in this case is an P well in the substrate, and the substrate in this case is an P-type substrate.

The memory cell stack layer 220 includes alternating gate conductive layers 230 and gate-to-gate dielectric layers 240. The number of pairs of gate conductive layers 230 and gate-to-gate dielectric layers 240 in the memory cell stack layer 220 may determine the number of memory cells 112 in the memory array 110. The gate conductive layer 230 may include conductive materials including but not limited to tungsten (W), cobalt (Co), copper (Cu), aluminum (Al), polysilicon, doped silicon, silicide or any combination thereof. In some possible implementations, each gate conductive layer 230 includes a metal layer, e.g., a tungsten layer. In some implementations, each gate conductive layer 230 includes a doped polysilicon layer. Each gate conductive layer 230 may include a gate surrounding the memory cell 112 and may extend laterally at the top of the memory cell stack layer 220 as DSL150, extend laterally at the bottom of the memory cell stack layer 220 as SSL160, or extend laterally between the DSL and the SSL as a WL130.

As shown in FIG. 2, the memory string 111 also includes a channel structure 250 extending vertically through the memory cell stack layer 220, the channel structure 250 includes a channel hole filled with at least one semiconductor material (e.g., a semiconductor channel) and at least one dielectric material (e.g., a memory film). In some implementations, the semiconductor channel includes silicon (e.g., memory film). In some implementations, the memory film is a composite dielectric layer including a tunnel layer, a trap layer, and a barrier layer. The channel structure 250 may have a cylindrical shape (e.g., a pillar shape). According to some implementations, a semiconductor channel, a trap layer (also referred to as storage layer) and a barrier layer are radially arranged in this order from the center of the pillar toward the outer surface of the pillar. A tunnel layer may include silicon oxide, silicon oxynitride, or any combination thereof. A trap layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide (ONO).

As shown in FIG. 2, a doped semiconductor layer 260 is stacked on top of the memory cell stack layer 220 in the memory string 111, the doped semiconductor layer 260 is also referred to as a bit line contact, the doped semiconductor layer 260 is coupled to the bit line, and the doped semiconductor layer 260 is an N-type doped semiconductor layer.

Referring back to FIG. 1, the peripheral circuit 140 is coupled to a plurality of word lines 130, the peripheral circuit 140 controls the memory cells in the selected memory string through controlling the voltage $V_{WL}$ of the word line 130 coupled to the selected memory string and the voltage $V_{BL}$ of the bit line coupled to the selected memory string to implement the following operating method.

Figure 3:
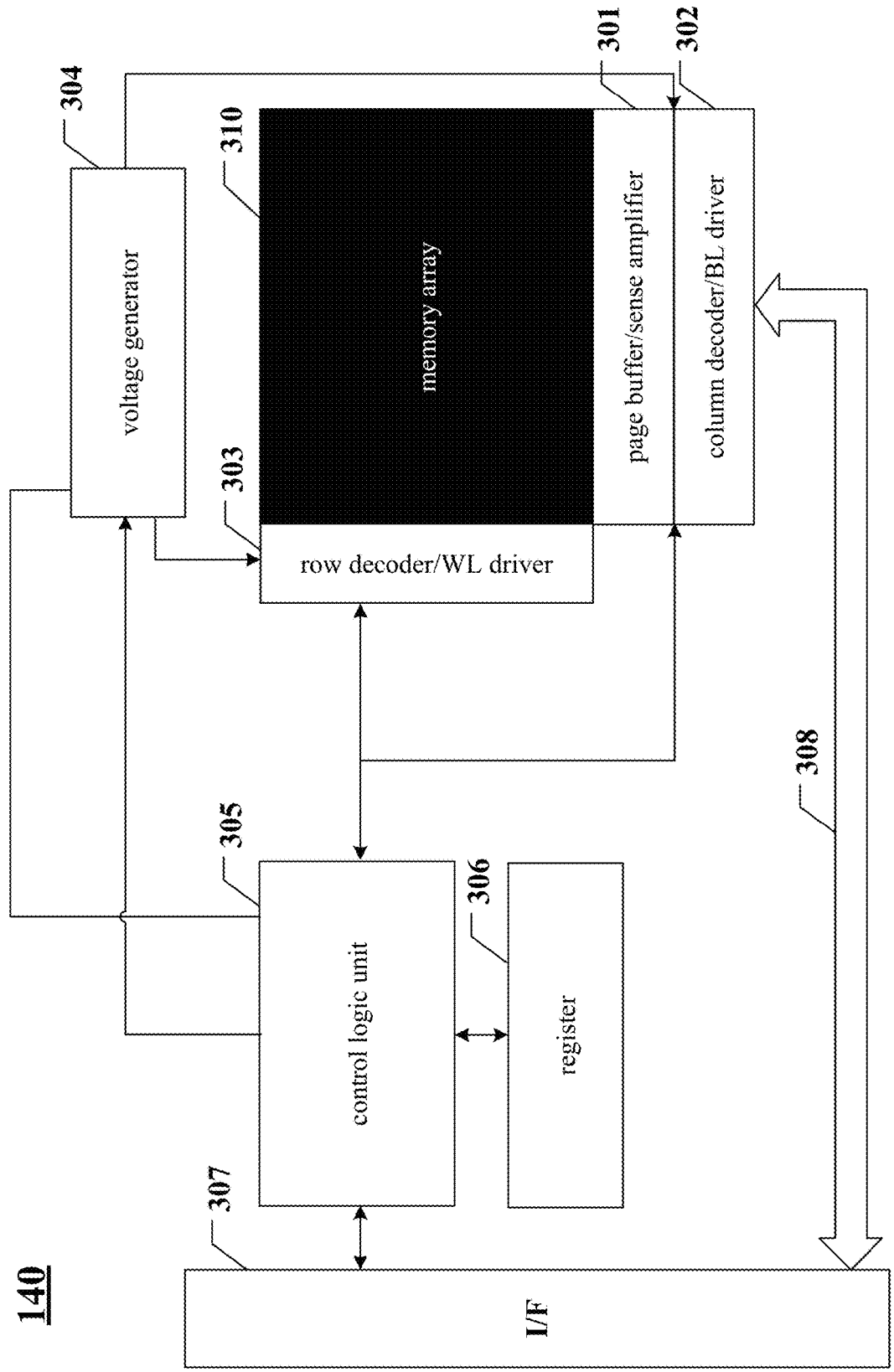
FIG. 3 is a schematic structure diagram of a peripheral circuit shown according to some implementations of the present disclosure.

The peripheral circuit 140 includes various types of peripheral circuits formed with metal-oxide-semiconductor (MOS) technology. For example, FIG. 3 illustrates a schematic structure diagram of a peripheral circuit according to some implementations of the present disclosure. Peripheral circuit 140 as shown in FIG. 3 includes page buffer/sense amplifier 301, column decoder/bit line (BL) driver 302, row decoder/word line (WL) driver 303, voltage generator 304, control logic unit 305, register 306, interface (I/F) 307 and data bus 308. In some examples, additional peripheral circuits not shown in FIG. 3 may also be included. The page buffer/sense amplifier 301 may be configured to read data from and program (write) data to the memory array 110 according to control signals from the control logic unit 305. In one example, the page buffer/sense amplifier 301 may store a page of programming data (written data) to be programmed into one physical page 320 of the memory array 110. In another example, page buffer/sense amplifier 301 may perform a programming verify operation to ensure that data has been correctly programmed into memory cell 112 coupled to selected word line. In yet another example, page buffer/sense amplifier 301 may also sense a low power signal from bit line representing a data bit stored in memory cell 112 and amplify a small voltage swing to a recognizable logic level during a read operation. The column decoder/bit line driver 302 may be configured to be controlled by control logic unit 305 and to select one or more memory strings 111 through applying a bit line voltage generated from voltage generator 304.

The row decoder/word line driver 303 may be configured to be controlled by control logic unit 305 and select/deselect memory block 11b of memory array 110 and select/deselect word line 130 of memory block 11b. The row decoder/word line driver 303 may also be configured to drive word line with a word line voltage generated from the voltage generator 304. As described in detail below, the row decoder/ word line driver 303 is configured to perform erase operations on the memory cells 112 coupled to the selected word line. The voltage generator 304 may be configured to be controlled by the control logic unit 305, and generate word line voltage (e.g., read voltage, programming voltage, pass voltage, local voltage, verify voltage, etc.), bit line voltage and source line voltage to be supplied to the memory array 110.

Control logic unit 305 may be coupled to each of the peripheral circuits described above and configured to control operations of each of the peripheral circuits. Register 306 may be coupled to the control logic unit 305 and include state register, command register and address register for storing state information, command operation code (OP code) and command address for controlling operations of each of the peripheral circuits 305. Interface 307 may be coupled to control logic unit 305 and act as a control buffer to buffer and relay control commands received from a host (not shown) to control logic unit 305 and to buffer and relay state information received from the control logic unit 305 to the host. The Interface 307 may also be coupled to column decoder/bit line driver 302 via data bus 308 and act as a data I/O interface and data buffer to buffer and relay data to/from memory array 110.

Figure 4:
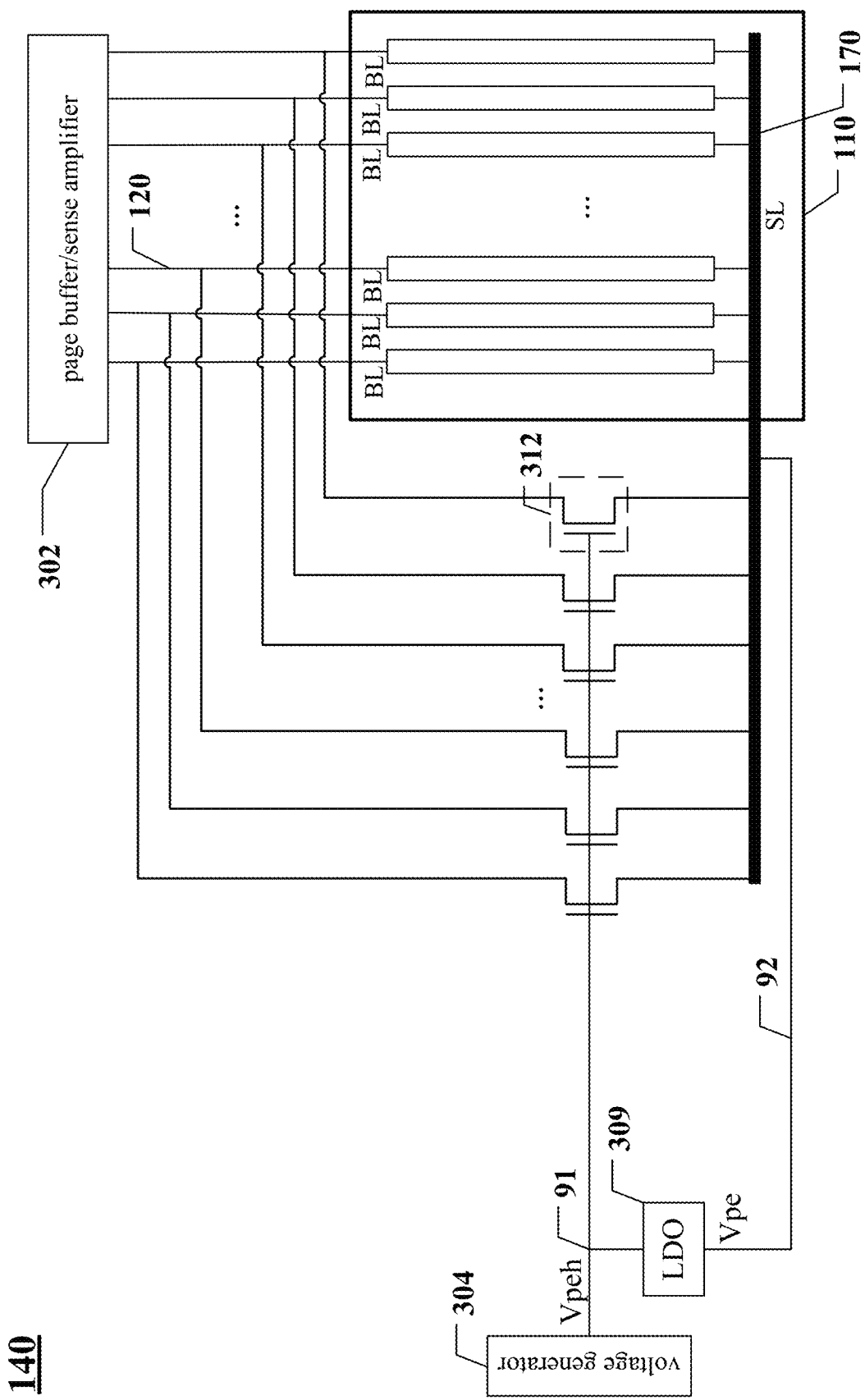
FIG. 4 is a local schematic structure diagram of another peripheral circuit shown according to some implementations of the present disclosure.

In an implementation, as shown in FIG. 4, the peripheral circuit 140 also includes a low dropout regulator (LDO) 309 and a plurality of driving crystals 312, wherein the control terminals of the voltage generator 304, the LDO 309 and the plurality of drive transistors 312 are all connected to the signal line 91, and the LDO 309 is also connected to the SL170 through the signal line 92. A first terminal of each drive transistor 312 is connected to a different BL120, and a second terminal of each drive transistor 312 is connected to a same SL170, the first terminal is the drain of the drive transistor 312, and the second terminal is the source of the drive transistor 312, or the first terminal is the source of the drive transistor 312 and the second terminal is the drain of the drive transistor 312.

When the memory block is being erased, the voltage generator 304 provides the voltage Vpeh to the signal line 91, so that the voltage Vpeh is applied on the LDO 309 and each drive transistor 312, the LDO 309 converts the voltage Vpeh into a voltage Vpe less than the voltage Vpeh, and provides the voltage Vpe to the signal line 92, so that the voltage Vpe is applied on the second terminal of the drive transistor 312 through the SL170, the voltage Vpeh at the control terminal of the drive transistor 312 is greater than the voltage Vpe at the second terminal, such that the drive transistor 312 is turned on, and the erase voltage is transmitted to the bit lines 120 and SL170 coupled to the memory string respectively, so that the TSG and BSG of the memory string generate GIDL.

However, the size of LDO 309 is relatively large, which may increase the area of the peripheral circuit 140. Based on this, in another implementation, the area of the peripheral circuit 140 is reduce through replacing the LDO 309 by adding a first switch circuit 310 between the voltage generator 304 and the drive transistor 312 and adding a second switch circuit 311 between the voltage generator 304 and the SL170.

Figure 5:
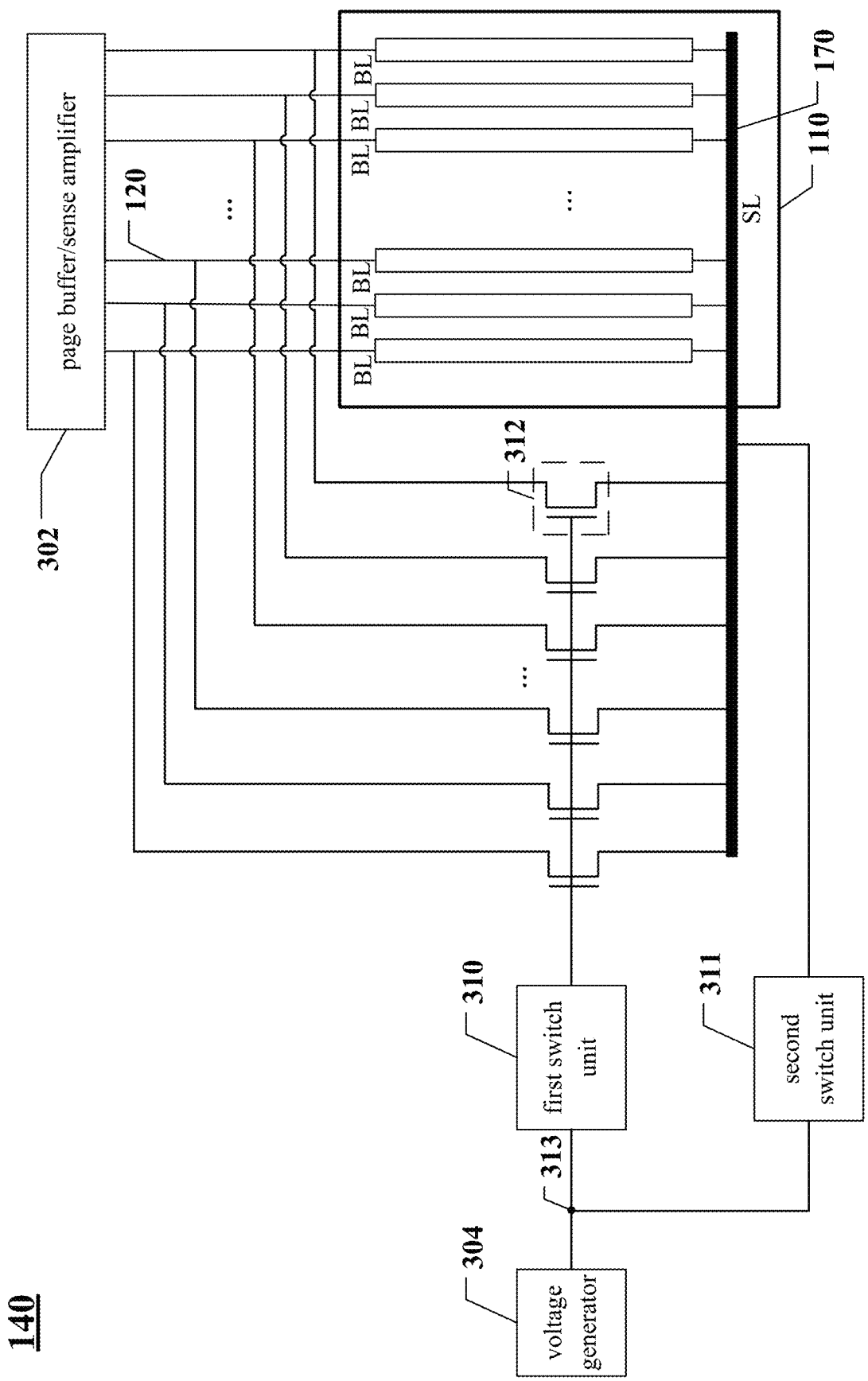
FIG. 5 is a local schematic structure diagram of another peripheral circuit according to some implementations of the present disclosure.

As shown in FIG. 5, the voltage generator 304, the first switch circuit 310 and the second switch circuit 311 are both connected to a same node (referred to as the first node 313). For example, the voltage generator 304, the first switch circuit 310 and the second switch circuit 311 are connected to a same signal line, and any position in the signal line is the first node or the signal line is the first node. The voltage generator 304 provides voltage to the first switch circuit 310 and the second switch circuit 311 through the first node.

The control terminals of the plurality of drive transistors 312 are all connected to the first switch circuit 310, and the control terminals of the drive transistors 312 are the gates of the drive transistors 312. A first terminal of each drive transistor 310 is connected to a different BL120, and a second terminal of each drive transistor 310 is connected to a same SL170, the first terminal is the drain of the drive transistor 310, and the second terminal is the source of the drive transistor 310, or the first terminal is the source of the drive transistor 310 and the second terminal is the drain of the drive transistor 310.

In an implementation, at least one of the first switch circuit 310 and the second switch circuit 311 includes a transistor and a voltage converter, wherein the voltage converter is coupled to a control terminal of the transistor, the voltage converter is configured to turn off or on the transistor through controlling the control terminal of the transistor.

Taking the first switch circuit 310 including a transistor and a voltage converter as an example, the transistor and the voltage converter in the first switch circuit 310 are respectively referred to as a first transistor and a first voltage converter, the first terminal (e.g., the source or the drain) of the first transistor is connected to the first node 313, the voltage provided by the voltage generator 304 for the first node 313 is applied on the first terminal of the first transistor, the second terminal of the first transistor terminal (e.g., the drain or source) is connected to the control terminal of each drive transistor 312, the first voltage converter is configured to: provide a voltage to the control terminal of the first transistor, and switch the voltage between the turn-on voltage and the turn-off voltage of the first transistor, wherein the turn-on voltage is greater than or equal to the threshold voltage of the first transistor, and the turn-off voltage is less than the threshold voltage of the first transistor, and if the voltage provided to the control terminal of the first transistor is a turn-on voltage, the first transistor is turned on, and thus, a voltage is provided to the control terminal of each drive transistor 312 through the first transistor. If the voltage provided to the control terminal of the first transistor is a turn-off voltage, the first transistor is turned off, and thus no voltage is provided to the control terminal of each drive transistor 312, such that the control terminal of each drive transistor 312 is floated.

Taking the second switch circuit 311 including a transistor and a voltage converter as an example, the transistor and the voltage converter in the second switch circuit 311 are respectively referred to as a second transistor and a second voltage converter, the first terminal (e.g., the source or the drain) of the second transistor is connected to the first node 313, the voltage provided by the voltage generator 304 for the first node 313 is applied on the first terminal of the second transistor, the second terminal of the second transistor terminal (e.g., the drain or source) is connected to the SL170, the second voltage converter is configured to: provide a voltage to the control terminal of the second transistor, and switch the voltage between the turn-on voltage and the turn-off voltage of the first transistor, wherein the turn-on voltage is greater than or equal to the threshold voltage of the second transistor, and the turn-off voltage is less than the threshold voltage of the second transistor, and if the voltage provided to the control terminal of the second transistor is a turn-on voltage, the second transistor is turned on, and thus, a voltage is provided to SL through the second transistor. If the voltage provided to the control terminal of the second transistor is a turn-off voltage, thus the second transistor is turned off, and no voltage is provided to SL.

In another implementation, at least one of the first switch circuit 310 and the second switch circuit 311 includes a transistor, and the at least one does not include a voltage converter, thus, another module in the peripheral circuit 140 that is independent of the first switch circuit 310 and the second switch circuit 311 may turn off or turn on the transistor through controlling the control terminal of the transistor, this another module may be or may not be a voltage converter.

Figure 6:
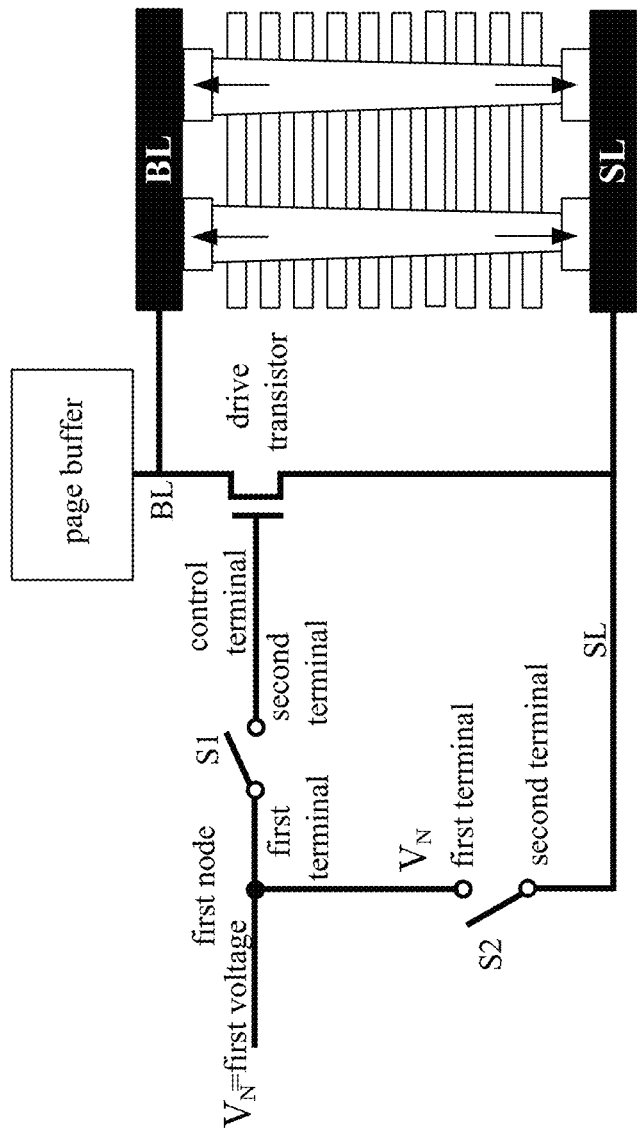
FIG. 6 is a circuit diagram including a drive transistor shown according to some implementations of the present disclosure.

As shown in FIG. 6, the first switch circuit 310 and the second switch circuit are labeled as S1 and S2 respectively. The first terminal of S1 and the first terminal of S2 are connected to the first node respectively, in the case that S2 is turned off and S1 is turned on, the voltage $V_2$ at the second terminal of any drive transistor is the voltage $V_{SL}$ of the SL connected to it, and the voltage at the second terminal of the SL is applied to the control terminal of each drive transistor, i.e., the voltage at the second terminal of the S1 is the voltage $V_G$ at the control terminal of each drive transistor, and if the voltage $V_G$ is greater than or equal to the threshold voltage $V_T$ for the drive transistor, the drive transistor is turned on. When the voltage loss between the first terminal and the second terminal of the drive transistor is ignored, after the drive transistor is turned on, the voltage $V_1=V_2=V_S$ at the first terminal of the drive transistor, the voltage $V_1$ is applied on the BL connected to the first terminal of the drive transistor, the BL transfers the voltage $V_1$ to the bit line contact of the memory string to which the BL is connected, by the application of voltage $V_1$, GIDL is generated between the bit line contact and the TSG of the memory string, and the holes in the GIDL are transferred to the channel of the memory string, and the electrons in the channel are transferred to the bit line contact to perform a GIDL erase on the memory cells in the memory string, thereby the drive transistor is to assist the memory string in performing a GIDL erase. After any drive transistor is turned on, the voltage $V_2$ at the second terminal of the drive transistor is transferred to the N-well by SL connected to the second terminal of the drive transistor, and by the application of the voltage $V_2$, GIDL is generated between the N-well and the BSG of the memory string, and the holes in the GIDL are transferred to the channel of the memory string, and the electrons in the channel are transferred to the N-well to perform a GIDL erase on the memory cells in the memory string, thereby the drive transistor is to assist the memory string in performing a GIDL erase.

The peripheral circuit described above is configured to perform an erase operation on the memory block in the memory, the erase operation may be described as follows in conjunction with the flow chart of the method for operating a memory shown in FIG. 7. The method shown in FIG. 7 includes performing an erase operation on any memory block in the memory, the erase operation includes the following operations.

Operation 701: turning off the first switch circuit to float the control terminals of the plurality of drive transistors.

The first switch circuit may include the first switch circuit 310 in FIG. 5, and the plurality of drive transistors may include the drive transistors 312 in FIG. 5. The process of turning off the first switch circuit 310 has been described above, and operation 701 may not be repeated in this example of the present disclosure.

Taking any drive transistor as an example, since the first switch circuit is connected to the control terminal of the drive transistor and the first switch circuit is turned off, the first switch circuit may not provide voltage to the control terminal of the drive transistor, such that the control terminal of the drive transistor is floated, and since the control terminal of the drive transistor is floated, the second terminal of the drive transistor is coupled with the floating control terminal.

Operation 702: a second switch circuit is turned on to provide a first voltage to the first node, wherein the first switch circuit and the second switch circuit are both connected to the first node, and the first voltage is greater than a threshold voltage of the drive transistor.

The second switch circuit may include the second switch circuit 311 in FIG. 5, and the first node may include the first node 313 in FIG. 5. The process of turning on the second switch circuit 311 has been described above and may not be repeated here. The first voltage is the highest voltage provided to the first node during the erase operation on the memory block, and the highest voltages for each of BLs and SLs are less than or equal to the first voltage during the erase operation, therefore, the first voltage is the maximum erase voltage applied to the memory string during the erase operation.

Figure 8:
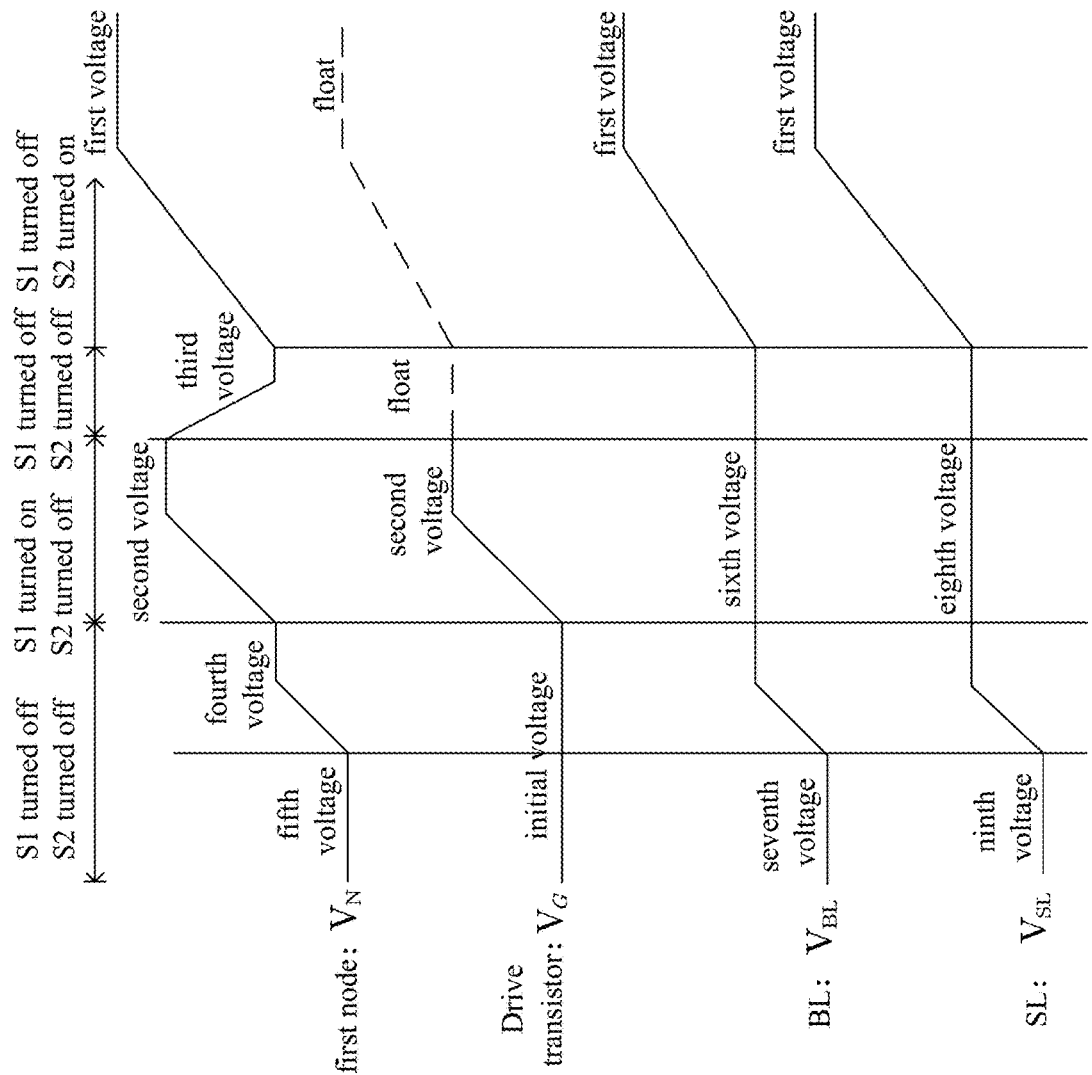
FIG. 8 is a voltage waveform diagram of some devices during the erase operation shown according to some implementations of the present disclosure.

With the circuit diagram shown in FIG. 6, by referring to the voltage waveform diagram shown in FIG. 8, during the period when S1 is turned off and S2 is turned on, the first voltage is provided to the first node, so that the voltage $V_N$ of the first node gradually rises to the first voltage from the voltage before S2 is turned on, and thereafter, the voltage $V_N$ is maintained at the first voltage, i.e., the voltage $V_N$ is equal to the first voltage.

In an implementation, the first voltage is provided to the first node through applying a first pulse signal to the first node, e.g., the first pulse signal is continuously applied to the first node, so that the voltage $V_N$ of the first node gradually rises to the first voltage.

Through controlling the voltage amplitude or pulse frequency of the first pulse signal, the slope of the voltage $V_N$ rising to the first voltage is controlled. For example, in the case that the pulse frequency is fixed, increasing the voltage amplitude of the first pulse signal causes the slope of the voltage $V_N$ to increase, and decreasing the voltage amplitude of the first pulse signal causes the slope of the voltage $V_N$ to decrease, or, in the case that the voltage amplitude is fixed, increasing the pulse frequency of the first pulse signal causes the slope of the voltage $V_N$ to increase, and decreasing the pulse frequency of the first pulse signal causes the slope of the voltage $V_N$ to decrease. Since the first voltage is the maximum erase voltage during the erase operation, increasing the slope of the voltage $V_N$ enables the voltage $V_N$ to quickly rise to the first voltage, so that the memory string in the memory block may quickly enter the erase state after S1 is turned off and S2 is turned on, thereby the duration of this erase operation (i.e., the erase duration) is reduced, i.e., the erase time is saved.

Next, continue to refer to FIGS. 6 and 8, after S1 is turned off and S2 is turned on, and the first voltage is provided to the first node, the influences for the voltage $V_G$ of the control terminal of the drive transistor, the voltage $V_{BL}$ and the voltage $V_{SL}$ of BL and SL to which the drive transistor are connected is described below.

Taking any drive transistor as an example, during the period of turning off S1, turning on S2 and providing voltage to the first node, since S1 is turned off, the second terminal of S1 may not provide a voltage to the control terminal of the drive transistor, such that the control terminal is floated. Thus, the first voltage is provided to the first node, since S2 is turned on, in the case of ignoring the voltage loss between the second terminal and the first terminal of S2, since the second terminal of S2 is coupled to SL, the first voltage is applied on SL through S2, such that the voltage $V_{SL}$ rises from the voltage before S2 is turned on to the first voltage, therefore, during the time period when S1 is turned off, S2 is turned on, and a voltage is provided to the first node, the waveforms of voltage $V_{SL}$ and voltage $V_N$ are similar.

Since the second terminal of the drive transistor is coupled to SL, SL applies the first voltage to the second terminal of the drive transistor, and during the time period when S1 is turned off, S2 is turned on, and a voltage is provided to the first node, the voltage $V_2$ at the second terminal of the drive transistor changes as the voltage $V_{SL}$ changes, i.e., gradually rises to the first voltage as the voltage $V_{SL}$ changes. Since the control terminal of the drive transistor floats during this time period, the control terminal and the second terminal of the drive transistor are coupled to form a capacitor, and the voltage jump principle at both ends of the capacitor causes the voltage $V_G$ at the control terminal to change as the voltage $V_2$ changes, as shown in FIG. 8, the waveforms of voltage $V_G$ and voltage $V_{SL}$ during this time period are similar.

Before turning off S1, turning on S2 and providing the first voltage to the first node, the drive transistor may or may not have been turned on. If the drive transistor has been turned on, as shown in FIG. 8, during the time period when S1 is turned off, S2 is turned on, and a voltage is provided to the first node, as the voltage $V_{SL}$ rises, the voltage $V_G$ at the control terminal of the drive transistor gradually rises, and during this time period, the BL is supplied with power through the drive transistor, and in the case of ignoring the voltage loss between the second terminal and the first terminal of the drive transistor, the drive transistor is turned on, such that the voltage $V_1=V_2=V_{SL}$ at the first terminal of the drive transistor, the first terminal of the drive transistor provides voltage $V_1$ to the BL, such that the voltage $V_{BL}$ of the BL gradually increases until it reaches the first voltage.

During this time period, the BL continues to apply voltage $V_{BL}$ to the bit line contact of the memory string connected to the BL, and as $V_{BL}$ increases to a certain level, a GIDL is generated between the bit line contact and the TSG of the memory string to perform a GIDL erase on the memory cells in the memory string, thereby the drive transistor is to assist the memory string in performing a GIDL erase. The SL continues to apply voltage $V_{SL}$ to the N-well connected to the SL, and as $V_{SL}$ increases to a certain level, a GIDL is generated between the N-well and the BSG of the memory string where the N well is located, to perform a GIDL erase on the memory cells in the memory string, thereby the drive transistor is to assist the memory string in performing a GIDL erase. The first voltage is the erase voltage applied to both ends of the memory string, the time period during which the voltage $V_{BL}$ and voltage $V_{SL}$ rise to the first voltage is the erase ramp up period, and the time period during which the voltage $V_{BL}$ and voltage $V_{SL}$ remain at the first voltage is the erase pulse period, therefore, during the erase operation, the drive transistor is maintained in the state of turning on during the erase rising period and the erasing pulse period, thereby avoiding the risk of downgrade or even break down caused by turning off the drive transistor, and improving the reliability of the circuit.

The above is described by an example for performing operation 701 firstly and then operation 702, however, in another implementation, operation 701 and operation 702 may also be performed at the same time, or operation 702 may be performed firstly and then operation 701, here, the example of the present disclosure does not limit the performing order of operation 701 and operation 702.

Figure 7:
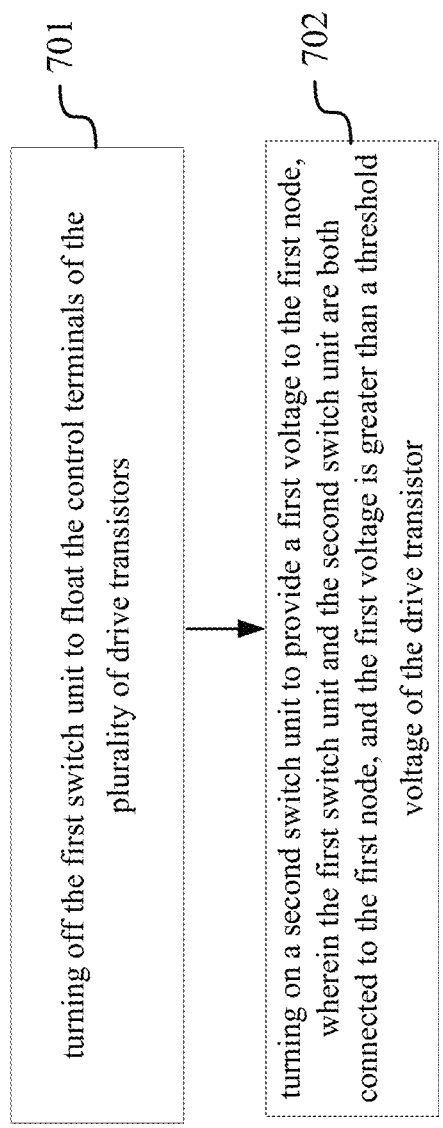
FIG. 7 is a flowchart of a method for operating a memory shown according to some implementations of the present disclosure.

In the method example shown in FIG. 7, the first node is connected to the control terminal and the second terminal of the drive transistor respectively through the first switch circuit and the second switch circuit, and the first node is connected to the source line connected to the memory string in the memory block through the second switch circuit, during the process of performing erase operation on the memory block, the control terminal of the drive transistor is floated through turning off the first switch circuit, which couples the second terminal of the drive transistor with the control terminal, and the first voltage is provided to the first node through turning on the second switch circuit, so that the first voltage is applied on the second terminal of the drive transistor through the turned-on second switch circuit and the source line, such that the voltage at the control terminal of the drive transistor changes as the voltage at the second terminal changes, since the first voltage is greater than the threshold voltage of the drive transistor, when the voltage at the control terminal reaches the threshold voltage, the drive transistor is turned on to perform a GIDL erase on the memory string coupled to the BL connected to the drive transistor.

Regarding to the process shown in operation 701 and operation 702 above, for the control terminal of the drive transistor, in other examples, the control terminal of the drive transistor is coupled to the first switch circuit, and also coupled to other modules in the peripheral circuit, and in the case that the first switch circuit is turned off, other modules provide an initial voltage to the control terminal, where the initial voltage of the control terminal is greater than or equal to 0V and less than the first voltage. In order to ensure that the voltage $V_G$ of the control terminal may quickly rise to the threshold voltage $V_T$ after the control terminal is floated, a voltage which is higher than the initial voltage may be provided to the control terminal through the first node before the control terminal is floated. Still taking FIG. 7 as an example, during the erase operation, S1 and S2 are firstly turned off, and other modules provide an initial voltage to the control terminal of the drive transistor, so that the voltage $V_G$ of the control terminal is maintained at the initial voltage, and S2 remains to be turned off, and then it is switched to the case that the first node supplies power to the control terminal of the drive transistor, S1 is turned on, and a second voltage is provided to the first node. In other examples, before switching to the case that the first node supplies power to the control terminal of the drive transistor, an initial voltage may be also provided to the control terminal of the drive transistor by other modules, and then the conduction voltage of the drive transistor may be provided to the control terminal of the drive transistor, such that the voltage $V_G$ of the drive transistor rises from the initial voltage to the turn-on voltage, and after the voltage $V_G$ remains at the turn-on voltage, it is switched to the case that the first node supplies power to the control terminal of the drive transistor, S1 is turned on, and the second voltage is provided to the first node, wherein the turn-on voltage is higher than the initial voltage at the control terminal of the drive transistor and lower than the second voltage. Before a second voltage is provided to the first node, a turn-on voltage which is lower than the second voltage is provided to the first node, to prevent the voltage $V_G$ from rising directly from the initial voltage to the second voltage, which on one hand, may improve the voltage tolerance of the control terminal of the driving transistor, and on the other hand, may also facilitate the subsequent voltage $V_G$ to quickly rise to the second voltage.

During the time period when the second voltage is provided to the first node, S1 applies the second voltage of the first node to the control terminal of the drive transistor, such that the voltage $V_G$ of the control terminal gradually rises from the initial voltage to the second voltage and remains at the second voltage, wherein, the second voltage is greater than the threshold voltage $V_T$ of the drive transistor, and as the voltage $V_G$ rises, when the voltage $V_G \geq V_T$, the drive transistor is turned on. Thereafter, S2 continues to remain being turned off and S1 is turned off, the control terminal of the drive transistor is floated, such that the voltage $V_G$ of the control terminal maintains at the second voltage and the drive transistor remains being turned on.

After the voltage $V_G$ remains at the second voltage, S2 remains being turned off, S1 is turned off, and a time period in which both S1 and S2 are turned off is entered. During this time period, since S1 is turned off, the control terminal of the drive transistor continues to remain being floated, the voltage $V_G$ of the drive transistor continues to remain at the second voltage, and the drive transistor continues to remain being turned on. During this time period, a third voltage is also provided to the first node, such that the voltage $V_N$ of the first node gradually discharges from the second voltage to the third voltage until being maintained at the third voltage. Thereafter, S1 continues to remain being turned off and S2 is turned on, and a time period in which S1 is turned off and S2 is turned on is entered, it is switched to the case that SL is supplied with power through S2, BL is supplied with power through the first terminal of the drive transistor, and the first voltage is provided to the first node, the first voltage is provided by the first node to the second terminal of the drive transistor through the turned-on S2 and SL, such that the voltage $V_2$ at the second terminal of the drive transistor rises, and since the second terminal of the drive transistor is coupled to the control terminal, such that the voltage $V_G$ of the drive transistor rises as the voltage $V_2$ rises, and the drive transistor continues to remain being turned on to transfer the first voltage at the second terminal of the drive transistor to the first terminal of the drive transistor, and the first voltage by the first terminal of the drive transistor is transferred to BL, to trigger the memory string to perform a GIDL erase.

Before providing the first voltage to the first node, through providing the second voltage to the first node, such that the drive transistor is in the turned-on state, and during the subsequent process in which the drive transistor delivers the first voltage to BL, the drive transistor may continue to remain being turned on, thereby preventing the drive transistor from being turned off during the erase ramp up period and erase pulse period. In some implementations, the second voltage is higher than a minimum erase voltage required to generate GIDL at the two ends of the memory string, and the time for BL and SL rising to the first voltage may be reduced by discharging the voltage $V_N$ to the third voltage before providing the first voltage to the first node, thereby HCI caused by the memory cell quickly entering the GIDL erase state is reduced. In other examples, after the voltage $V_N$ is maintained at the second voltage, the voltage $V_N$ may not be discharged, and S1 continues to remain being turned off, S2 is turned on, and the first voltage is provided to the first node.

A second voltage is provided to the first node by providing a second pulse signal to the first node, and a third voltage is provided to the first node by providing a third pulse signal to the first node. Before providing the first voltage to the first node, both of the operations of providing the second voltage to the first node and discharging the voltage $V_N$ to the third voltage may increase the erase time for the memory block. In some examples, in order to minimize the increased erase time, the slope of the voltage $V_N$ rising to the second voltage may also be increased by controlling the voltage amplitude or pulse frequency of the second pulse signal, so as to minimize the increase in erase time due to providing the second voltage; and the slope of the voltage $V_N$ decreasing to the third voltage may be increased by controlling the voltage amplitude or pulse frequency of the third pulse signal, so as to minimize the increase in erase time due to providing the third voltage. Wherein, the way for controlling the voltage amplitude or pulse frequency of the second pulse signal and the way for controlling the voltage amplitude or pulse frequency of the third pulse signal may both refer to the way for controlling the voltage amplitude or pulse frequency of the first pulse signal described above, which may not be repeated here.

During the process of erase operation, assuming that the initial voltage of the signal line at which the first node is located is the fifth voltage, in some examples, before providing the second voltage to the first node, S1 and S2 are firstly turned off, and a fifth voltage is provided to the first node, such that the voltage $V_N$ of the first node maintains at the fifth voltage, then S2 remains being turned off, S1 is turned off, and the second voltage is provided to the first node, such that the voltage $V_N$ rises from the initial voltage to the second voltage.

In other examples, as shown in FIG. 7, before providing the second voltage to the first node, S1 and S2 are firstly turned off, and a fifth voltage is provided to the first node, such that the voltage $V_N$ maintains at the fifth voltage, a fourth voltage is provided to the first node, such that the voltage $V_N$ rises from the fifth voltage to the fourth voltage and maintains at the fourth voltage, then S2 remains being turned off, S1 is turned off, and the second voltage is provided to the first node, such that the voltage $V_N$ rises from the fourth voltage to the second voltage, wherein the fourth voltage is less than the second voltage, a voltage is provided to the first node, that is, a voltage is provided to the signal line at which the first node is located, and before a second voltage is provided to the first node, the voltage of the first node is boosted by providing a fourth voltage to the first node, to prevent the voltage of the signal line at which the first node is located from rising directly from the initial voltage to the second voltage, thereby increasing the voltage tolerance of the signal line at which the first node is located. The fourth voltage is also greater than the fifth voltage, and the fourth voltage and the third voltage may be the same or different. In other examples, the fifth voltage is not used as the initial voltage of the first node, instead, the fourth voltage is used as the initial voltage of the first node, in this case, there is no need to provide the fifth voltage to the first node.

The above description takes providing the second voltage to the first node as an example, and in some other examples, the second voltage may not be provided to the first node, and in this case, there is no need to discharge the voltage $V_N$ to the third voltage. For example, when the voltage $V_N$ of the first node is maintained at the fifth voltage or the fourth voltage, S1 continues to remain being turned off, S2 is turned on, and the first voltage is provided to the first node, such that the voltage $V_N$ rises from the currently maintained voltage to the first voltage.

In some examples, BL is coupled to the first terminal of the drive transistor, and also coupled to other modules in the peripheral circuit (e.g., the BL in FIG. 4 is also coupled to the page buffer). Before the second switch circuit is turned on, an initial voltage is provided by other modules to the BL, and the initial voltage of the BL is greater than or equal to 0V and less than the first voltage. Still taking FIG. 7 as an example, during the erase operation, assuming that the initial voltage of BL is the seventh voltage, before S2 is turned on, S2 remains being turned off, initially, other modules firstly provide the seventh voltage to BL, and after the voltage $V_{BL}$ of BL is maintained at the seventh voltage, the sixth voltage is provided to BL, so that $V_{BL}$ remains at the sixth voltage until S2 is turned on, then it is switched to the case that BL is supplied with power by the drive transistor, or firstly BL is supplied with power by the drive transistor firstly, then S2 is turned on. In turn, the first node provides the first voltage to the second terminal of the drive transistor by turning on S2 and SL, and as the voltage $V_2$ of the drive transistor increases, $V_{BL}$ gradually increases from the sixth voltage to the first voltage, wherein the seventh voltage is less than the sixth voltage, and the sixth voltage is less than the first voltage. Before providing the first voltage to the first node, the voltage $V_{BL}$ is boosted by providing the sixth voltage to the BL, thereby preventing the voltage $V_{BL}$ from directly rising from the seventh voltage to the first voltage, thereby increasing the voltage tolerance of the BL.

During the erase operation, if the fourth voltage is provided to the first node and the sixth voltage is provided to BL, for the purpose of control, in some examples, as shown in FIG. 7, the fourth voltage may be provided to the first node and the sixth voltage may be provided to the BL at the same time, and in other examples, the fourth voltage may be provided to the first node and the sixth voltage may be provided to the BL at different times, respectively, e.g., the fourth voltage is firstly provided to the first node, and then the sixth voltage is provided to BL; or the sixth voltage is firstly provided to BL, and then the fourth voltage is provided to the first node. In some other examples, instead of using the seventh voltage as the initial voltage of BL, the sixth voltage is used as the initial voltage of BL, and thus, there is no need to provide the seventh voltage to BL, i.e., the voltage $V_{BL}$ is maintained at the seventh voltage before S2 is turned on.

In some examples, the SL may also be supplied with power through other modules, and when an erase operation is being performed on the memory block, it is switched to the case that the SL is supplied with power through the second switch circuit. For example, before the second switch circuit is turned on, an initial voltage is provided by other modules to the SL, and the initial voltage of the SL is greater than or equal to 0V and less than the first voltage. Still taking FIG. 7 as an example, during the process of performing erase operation on the memory block, assuming that the initial voltage of SL is the ninth voltage, before S2 is turned on, S2 remains being turned off, initially, other modules firstly provide the ninth voltage to SL, and after the voltage $V_{SL}$ of SL is maintained at the ninth voltage, the eighth voltage is provided to BL, so that $V_{SL}1$ remains at the eighth voltage until S2 is turned on, then it is switched to the case that BL is supplied with power by S2, or BL is supplied with power by S2 firstly, then S2 is turned on. In turn, S2 is turned on, and then the first node provides the first voltage to SL, so that the voltage $V_{SL}$ gradually increases from the eighth voltage to the first voltage, wherein the ninth voltage is less than the eighth voltage, and the eighth voltage is less than the first voltage. Before providing the first voltage to the first node, the voltage of the SL is boosted by providing the eighth voltage to the SL, thereby preventing the voltage $V_{SL}$ from directly rising from the ninth voltage to the first voltage, thereby increasing the voltage tolerance of the SL.

During the erase operation, if the fourth voltage is provided to the first node and the eighth voltage is provided to SL, for the purpose of control, in some examples, as shown in FIG. 7, the fourth voltage may be provided to the first node and the eighth voltage may be provided to the SL at the same time, and in other examples, the fourth voltage may be provided to the first node and the eighth voltage may be provided to the SL at different times, respectively, e.g., the fourth voltage is firstly provided to the first node, and then the eighth voltage is provided to SL; or the eighth voltage is firstly provided to SL, and then the fourth voltage is provided to the first node. In some other examples, instead of using the ninth voltage as the initial voltage of SL, the eighth voltage is used as the initial voltage of SL, and thus, there is no need to provide the eighth voltage to SL, i.e., the voltage $V_{SL}$ is maintained at the eighth voltage before S2 is turned on.

For the erase operation process described above, for the convenience of description, the voltage loss among the first node, S2, S1, the drive transistor, and SL is ignored, based on this, as shown in FIG. 7, during the time period when the first voltage is provided to the first node, both the voltage $V_{SL}$ and the voltage $V_{BL}$ may rise to the first voltage, if voltage losses are taken into account, during the time period when the first voltage is provided to the first node, the voltage $V_{SL}$ and/or the voltage $V_{BL}$ may not reach the first voltage but be slightly lower than the first voltage. For the erase operation process described above, for the convenience of description, the signal transmission delay among the first node, S2, S1, the drive transistor, and SL is ignored, based on this, as shown in FIG. 7, after S1 is turned off and S2 is turned on and the first voltage is applied to the first node, the voltage $V_N$, voltage $V_G$, voltage $V_{BL}$, and voltage $V_{SL}$ rise simultaneously, if the signal transmission delay is taken into account, during the time period when the first voltage is provided to the first node, the voltage $V_{SL}$, voltage $V_G$, and the time when the voltage $V_{BL}$ starts to rise may all be later than the time when the voltage $V_N$ starts to rise, and the time when the voltage $V_{SL}$ starts to rise, the time when the voltage $V_G$ starts to rise, and the time when the voltage $V_{BL}1$ starts to rise may be the same or different.

The memory 100 described above may be applied in a memory system to provide data storage service for a host in the memory system. Next, the architecture of the memory system is described as follows.

Figure 9:
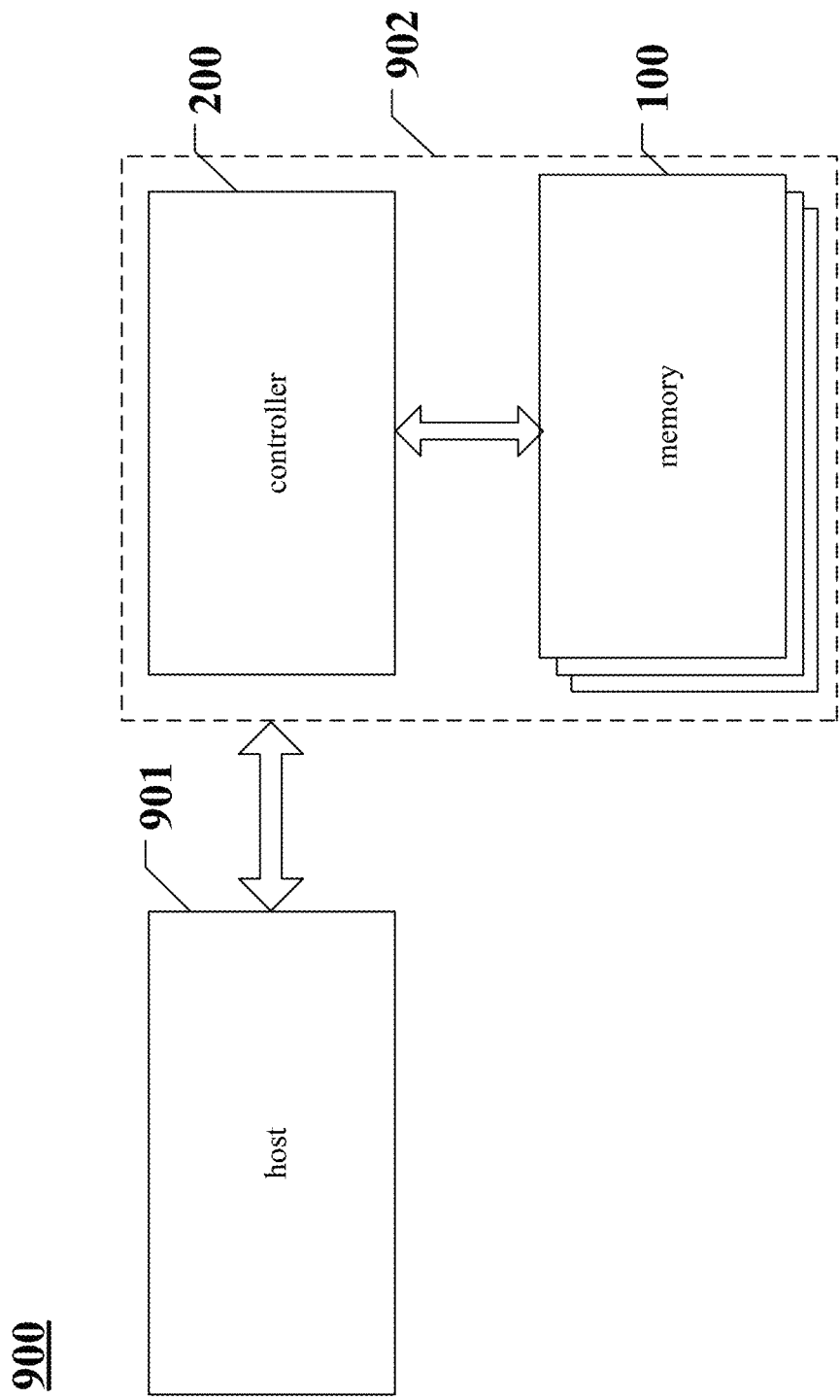
FIG. 9 is a schematic diagram of a memory system shown according to some implementations of the present disclosure.

FIG. 9 is a schematic diagram of a memory system according to some implementations of the present disclosure, as shown in FIG. 9, the memory system 900 may be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory device therein.

As shown in FIG. 9, the memory system 900 includes a host 901 and a storage subsystem 902, the host 901 may be a processor of an electronic device (e.g., a central processing unit (CPU)) or a system on chip (SoC) (e.g., an application processor (AP)). The host 901 may be configured to send data to memory 100 in the storage subsystem 902. Alternatively, the host 901 may be configured to receive data from the memory 100.

The storage subsystem 902 includes one or more memories 100 and controller 200. Therein, the memory 100 is coupled to the controller 200. The memory 100 may be any memory disclosed in the present disclosure. Optionally, the memory 100 is a NAND flash memory device. The NAND flash memory device is e.g., a three-dimensional (3D) NAND flash memory device.

According to some implementations, the controller 200 is also coupled to the host 901. The controller 200 may manage data stored in the memory 100 and communicate with the host 901.

In an implementation, the controller 200 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc.

In an implementation, the controller 200 is designed to operate in high duty cycle environment solid state drive (SSD) or embedded multimedia card (eMMC), where SSDs or eMMCs are used as data storage for mobile devices such as smartphone, tablet computer, laptop computer, and enterprise storage array.

The controller 200 may be configured to control operations of the memory 100, e.g., reading, erasing, and programming operations. The controller 200 may be further configured to manage various functions related to data stored or to be stored in memory 100, including but not limited to bad block management, garbage collection, logical-to-physical address translation, wear leveling, etc. In an implementation, the controller 200 is also configured to process error correction code (ECC) related to data read from or written to memory 100.

The controller 200 may also perform any other suitable functions, e.g., formatting memory 100. The controller 200 may communicate with external devices (e.g., host 901) according to a particular communication protocol. For example, the controller 200 may communicate with an external device through at least one of various interface protocols, e.g., USB protocol, MMC protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The controller 200 and one or more memories 100 may be integrated into various types of storage devices, e.g., included in the same package (e.g., Universal Flash Storage (UFS) package or eMMC package). That is, the memory system 900 may be implemented and packaged into different types of terminal electronic products.

Figure 10:
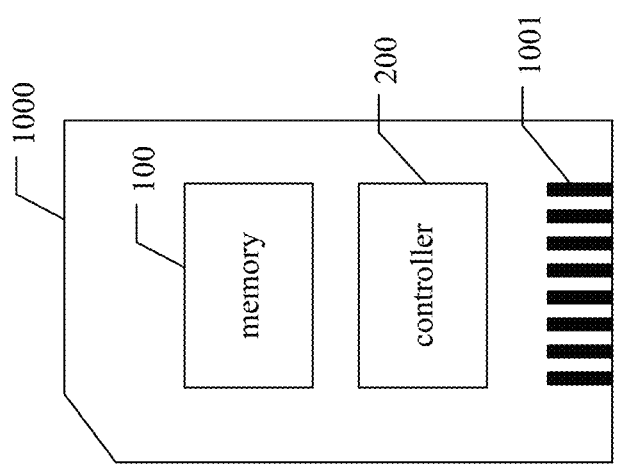
FIG. 10 is a schematic diagram of a memory card shown according to some implementations of the present disclosure.

FIG. 10 is a schematic diagram of a memory card shown according to some implementations of the present disclosure, as shown in FIG. 10, the controller 200 and a single memory 100 may be integrated into a memory card 1000. Memory card 1000 may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 1000 may further include a memory card connector 1001 coupling memory card 1001 with a host (e.g., host 901 in FIG. 9).

Figure 11:
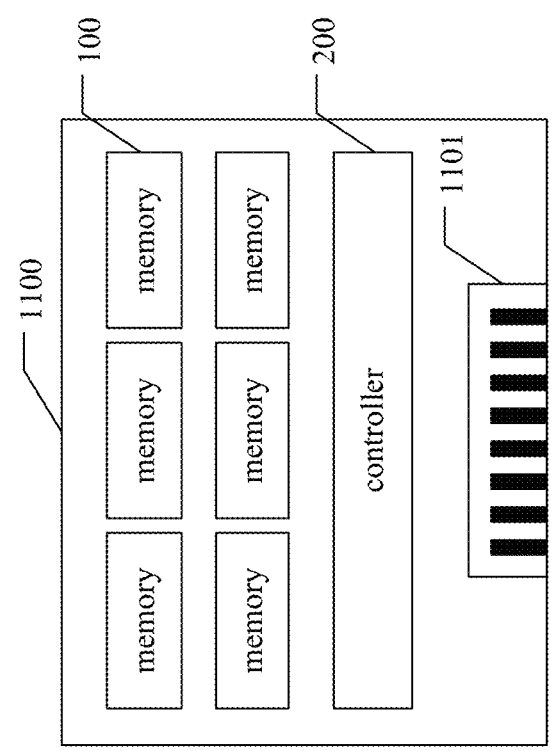
FIG. 11 is a schematic diagram of a solid-state drive shown according to some implementations of the present disclosure.

FIG. 11 is a schematic diagram of a solid-state drive shown according to some implementations of the present disclosure, as shown in FIG. 11, the controller 200 and the plurality of memories 100 may be integrated into the solid-state drive (SSD) 1100. The solid-state drive 1100 may also include a solid-state drive connector 1101 that couples solid state drive 1100 to a host (e.g., host 901 in FIG. 9). In an implementation, the storage capacity and/or operating speed of the solid-state drive 1100 is greater than the storage capacity and/or operating speed of the memory card 900.

The above description is only some implementations of the present disclosure of the application, and is not intended to limit the application, and any modification, equivalent replacement and improvement, etc., made within the spirit and principles of the present disclosure shall be included within the protection scope of the present disclosure.

What is claimed is:

1. A memory device, including:
a plurality of memory blocks each including a plurality of memory strings connected between a common source line and a plurality of bit lines; and
a peripheral circuit including:
a plurality of drive transistors connected between the common source line and the plurality of bit lines;
a first switch circuit connected between a first node and the plurality of drive transistors; and
a second switch circuit connected between the first node and the common source line;
wherein the peripheral circuit is configured to perform an erase operation on the memory blocks, comprising:
turning off the first switch circuit to float control terminals of the plurality of drive transistors, and
turning on the second switch circuit to provide a first voltage greater than a threshold voltage of the plurality of drive transistors to the first node.

2. The memory device of claim 1, wherein the peripheral circuit is further configured to, before turning off the first switch circuit:
turn on the first switch circuit;
turn off the second switch circuit; and
provide a second voltage less than the first voltage to the first node.

3. The memory device of claim 2, wherein the peripheral circuit is further configured to, after providing the second voltage to the first node:
turn off the first switch circuit; and
decrease the second voltage on the first node to a third voltage.

4. The memory device of claim 2, wherein the peripheral circuit is further configured to:
before providing the second voltage to the first node, increase a fifth voltage on the first node to a fourth voltage which is less than the second voltage, or provide the fourth voltage to the first node.

5. The memory device of claim 1, wherein the peripheral circuit is further configured to:
before providing the first voltage to the first node, increase a seventh voltage on at least one bit line to a sixth voltage which is less than the first voltage, or provide the sixth voltage to the at least one bit line.

6. The memory device of claim 1, wherein the peripheral circuit is further configured to:
before providing the first voltage to the first node, increase a ninth voltage on the common source line to an eighth voltage which is less than the first voltage.

7. The memory device of claim 1, wherein at least one of the first switch circuit and the second switch circuit includes a transistor.

8. The memory device of claim 1, wherein the at least one of the first switch circuit and the second switch circuit further includes:

a voltage converter coupled to a control terminal of the transistor and configured to provide a control voltage to the control terminal to turn off or turn on the transistor.

9. A method for operating a memory device, wherein the memory device includes: a plurality of memory blocks each including a plurality of memory strings connected between a common source line and a plurality of bit lines; and a peripheral circuit including: a plurality of drive transistors connected between the common source line and the plurality of bit lines, a first switch circuit connected between a first node and the plurality of drive transistors; and a second switch circuit connected between the first node and the common source line;

the method including performing an erase operation on the memory block, the erase operation including:
turning off the first switch circuit to float control terminals of the plurality of drive transistors, and
turning on the second switch circuit to provide a first voltage greater than a threshold voltage of the plurality of drive transistors to the first node.

10. The method of claim 9, wherein the erase operation further includes, before turning off the first switch circuit:
turning on the first switch circuit;
turning off the second switch circuit; and
providing a second voltage less than the first voltage to the first node.

11. The method of claim 10, wherein the erase operation further includes, after providing the second voltage to the first node:
turning off the first switch circuit; and
decreasing the second voltage on the first node to a third voltage.

12. The method of claim 10, wherein the erase operation further includes:
before providing the second voltage to the first node, increasing a fifth voltage on the first node to a fourth voltage which is less than the second voltage, or providing the sixth voltage to the at least one bit line.

13. The method of claim 9, wherein the erase operation further includes:
before providing the first voltage to the first node, increasing a seventh voltage on at least one bit line to a sixth voltage which is less than the first voltage, or providing the sixth voltage to the at least one bit line.

14. The method of claim 9, wherein the erase operation further includes:
before providing the first voltage to the first node, increasing a ninth voltage on the common source line to an eighth voltage which is less than the first voltage.

15. The method of claim 9, wherein the erase operation further includes:

providing a control voltage to a control terminal of a transistor in the first switch circuit or the second switch circuit to turn off or turn on the transistor.

16. A memory system, including:
a memory device including:
a plurality of memory blocks each including a plurality of memory strings connected between a common source line and a plurality of bit lines; and
a peripheral circuit including:
a plurality of drive transistors connected between the common source line and the plurality of bit lines;
a first switch circuit connected between a first node and the plurality of drive transistors; and
a second switch circuit connected between the first node and the common source line;
wherein the peripheral circuit is configured to perform an erase operation on the memory blocks, comprising:
turning off the first switch circuit to float control terminals of the plurality of drive transistors, and
turning on the second switch circuit to provide a first voltage greater than a threshold voltage of the plurality of drive transistors to the first node; and
a controller coupled to the memory device and configured to control the memory device.

17. The memory system of claim 16, further includes:
a host coupled to the controller and configured to transmit data to and receiving data from the memory device through the controller.

18. The memory system of claim 16, wherein the peripheral circuit is further configured to, before turning off the first switch circuit:
turn on the first switch circuit;
turn off the second switch circuit; and
provide a second voltage less than the first voltage to the first node.

19. The memory system of claim 18, wherein the peripheral circuit is further configured to, after providing the second voltage to the first node:
turn off the first switch circuit; and
decrease the second voltage on the first node to a third voltage.

20. The memory system of claim 18, wherein the peripheral circuit is further configured to:
before providing the second voltage to the first node, increase a fifth voltage on the first node to a fourth voltage which is less than the second voltage, or provide the fourth voltage to the first node.

* * * * *